(12) United States Patent
Kunimatsu et al.

(10) Patent No.: US 6,314,352 B1
(45) Date of Patent: Nov. 6, 2001

(54) AUTOMATIC CONTROL SYSTEM FOR CAR ACCESSORY

(75) Inventors: Yoshimasa Kunimatsu; Chikao Nagasaka; Masato Nishikawa; Yoshihisa Hirano; Toshiyuki Isogai, all of Aichi-ken (JP)

(73) Assignee: Kabushiki Kaisha Tokai-Rika-Denki-Seisakusho (JP)

( * ) Notice: Subject to any disclaimer, the term of this patent is extended or adjusted under 35 U.S.C. 154(b) by 0 days.

(21) Appl. No.: 09/581,221

(22) PCT Filed: Oct. 25, 1999

(86) PCT No.: PCT/JP99/05882

§ 371 Date: Jun. 23, 2000

§ 102(e) Date: Jun. 23, 2000

(87) PCT Pub. No.: WO00/24610

PCT Pub. Date: May 4, 2000

(30) Foreign Application Priority Data

Oct. 26, 1998 (JP) .................................................. 10-304587

(51) Int. Cl.[7] .................................................. B60R 16/02
(52) U.S. Cl. ............................... 701/36; 701/49; 701/211; 340/996
(58) Field of Search .................................. 701/36, 35, 49, 701/208, 210, 211; 340/995, 996

(56) References Cited

U.S. PATENT DOCUMENTS 4,503,528 * 3/1985 Nojiri et al. .......................... 367/198
5,424,585 * 6/1995 Geraghty .............................. 307/10.8
5,835,008 * 11/1998 Colemere, Jr. ....................... 340/439
6,154,123 * 11/2000 Kleinberg ............................. 340/436

FOREIGN PATENT DOCUMENTS

| 4-201712 | 7/1992 | (JP) . |
| 6-231392 | 8/1994 | (JP) . |
| 6-231393 | 8/1994 | (JP) . |
| 7-81498 | 3/1995 | (JP) . |
| 7-104677 | 4/1995 | (JP) . |
| 7-146698 | 6/1995 | (JP) . |

* cited by examiner

*Primary Examiner*—Tan Nguyen
(74) *Attorney, Agent, or Firm*—Nixon Peabody LLP; Thomas W. Cole

(57) ABSTRACT

An automatic control system is provided that allows a driver to decide whether some or all of an automatic control content for accessory devices for an automobile is to be executed. Trigger information for performing automatic control is detected by a detecting circuit such as a navigation system 12 and, on the basis of the detected trigger information, control contents are established at a control circuit 20, and the established control contents are announced to the driver through the navigation system 12 and an audio system 16. The driver replies to each of the corresponding announced contents (the contents to be automatically controlled) by operating an answer switch 100. At the control section 20, automatic control is performed in accordance with results of replies from the driver operating the answer switch 100.

8 Claims, 7 Drawing Sheets

AUTOMATIC CONTROL SYSTEM FOR CAR ACCESSORY

TECHNICAL FIELD

The present invention relates to an automatic control system for accessory devices for an automobile, which performs automatic control of the accessory devices for the automobile, such as electrical components for the automobile, using a navigation system, various kinds of sensors, and the like.

CONVENTIONAL TECHNOLOGY

In recent years, automatic control technology has been incorporated into electrical components for automobiles, and electrical components having automatic control functions have increased. For example, in a case in which an automobile is AT (Automatic Transmission), there is an automatic control system in which a condition of the automobile is judged by a position of a shift lever and, by pressing a button provided at the shift lever, with a single action, batch control of a variety of the functions set in advance is performed and driver operations needed for each condition are reduced. With this automatic control system, by pressing the button, the batch controls of various kinds of functions which will be described as follows can be performed. By pressing this button in a case in which the position of the AT shift is in P (Parking) range, door lock release, seatbelt buckle release, door mirror retraction, turning on of a courtesy lamp, rear sliding of a seat, seat side support loosening, and the like are performed as a batch. In a case in which the position of the AT shift is in R (Reverse) range, correction of downward field of vision of a left door mirror, seatbelt tension release, rearview mirror anti-glare release, and the like and, in a case in which the position of the AT shift is in D (Drive) range, door mirror returning, turning off of the courtesy lamp, door locking, and the like are batch-controlled.

Further, in an automatic control system using a navigation system, for example, at a time of entering a tunnel, upon receiving a tunnel information from the navigation system, a variety of functions which have been set in advance such as turning lights on, closing door windows, switching an air conditioner from intake of outside air to circulation of inside air, and the like are batch-controlled.

However, conventional automatic control systems for accessory devices for automobiles have performed not control on the basis of the wishes of all drivers, but control referred to average feelings of drivers, and control which meets the wishes of respective drivers has not always been done. Accordingly, an automatic control system for accessory devices for an automobile which enables control that easily reflects the wishes of a driver is required.

PROBLEMS TO BE SOLVED BY THE INVENTION

The present invention has been made to solve the above-described problem, and an object of the present invention is to provide an automatic control system for accessory devices for an automobile in which a function whereby a driver can decide with respect to advisability of automatic control for accessory devices for the automobile is added and control which reflects the wishes of the driver is possible.

DISCLOSURE OF THE INVENTION

An automatic control system for accessory devices for an automobile which automatically controls a plurality of accessory devices for the automobile, which are disposed at the automobile, in accordance with a predetermined condition is the invention recited in claim 1, comprising: a detecting means which detects trigger information for starting automatic control; a control means which stores a plurality of automatic control contents, each of which is a combination of automatic control items for the accessory devices for the automobile, determines an automatic control content on the basis of the trigger information detected by the detecting means, and performs control of the accessory devices for the automobile in accordance with the automatic control content; an announcing means which announces the automatic control content to be performed by the control means before automatic control is performed; and an input means for inputting a reply concerning advisability of implementation of the automatic control content announced by the announcing means, wherein automatic control is performed in accordance with the reply that is input at the input means.

According to the invention recited in claim 1, in the automatic control system for accessory devices for the automobile which automatically controls the plurality of accessory devices for the automobile disposed at the automobile in accordance with the predetermined conditions, the trigger information is detected with the detecting means such as a navigation system, sensors, and the like that detects the trigger information needed for starting (performing) control of the accessory devices for the automobile, at the control means, from the plurality of automatic control contents which have been stored (set) in advance, the automatic control contents to be controlled are established on the basis of the trigger information detected by the detecting means and automatic control for the accessory devices for the automobile is performed, and the automatic control content established by the control means is announced by the announcing means. The reply concerning the yes-no of implementation of the announced content (the automatic control content or, in other words, respective automatic control items) is input at the input means and, at the control means, automatic control is performed on the basis of results of input at the input means. In this way, by announcing the automatic controls content by the announcing means and inputting the advisability of implementation for the content at the input means, control in which the driver's wishes are reflected can be performed easily, and the driver can drive without feeling annoyance with controls that go against his or her operating wishes. Also, if the input means is disposed at a position where the driver can operate it easily, every operation can be performed quickly and, if the input means is disposed at a position where the driver and occupants can operate it, control that also reflects the occupants wishes can be performed.

The invention according to claim 2 is the automatic control system for accessory devices for the automobile recited in claim 1, wherein the detecting means is a navigation system which determines the location of the automobile.

The invention according to claim 3 is the automatic control system for accessory devices for the automobile recited in claim 2, wherein the trigger information is map information associated with the location of the automobile which is transmitted from the navigation system.

In accordance with the invention according to claims 2 and 3, the detecting means which detects the trigger information for performing automatic control is the navigation system which locates the location of the automobile and performs guidance to a destination and, by utilizing the map information associated (attached) with the automobile location that is transmitted from the navigation system as the trigger information, the automatic control content for the plurality of accessory devices for the automobile disposed at the automobile is established. Further, the established automatic control content is announced to the driver by the announcing means, and the driver performs replies with respect to the advisability of implementation of the announced automatic control content by the input means. In this way, control that reflects the driver's wishes can be performed. Therefore, the driver can drive without feeling annoyance with controls that go against his or her operating wishes. For example, if tunnel information has been obtained from the navigation system as trigger information, if the automatic control content including items such as closing windows, turning lights on, switching an air conditioner to inside air and the like, has been established, the automatic control content (the respective automatic control items) are announced to the driver. By performing replies with respect to the advisability of implementation of the announced automatic control content (each automatic control item) via the input means, control in which the driver's wishes are reflected can be performed.

The invention according to claim 4 is the automatic control system for accessory devices for the automobile recited in claim 1, wherein the input means is formed by two operating sections which are YES and NO.

In accordance with the invention recited in claim 4, the input means includes two operating sections which are YES and NO and, by simple binary decisions, the wishes of the driver can be reflected. For example, if the two switches which are YES and NO are disposed at a steering wheel, the driver replies to the content announced by the announcing means by operating the two switches, and if control in a manner appropriate to the reply is performed, control in which the wishes of the driver are reflected can be performed without operation of many switches. Further, if the above-described YES/NO switches are disposed at an operating section of the navigation system or the like, operation not only by the driver but also by an occupant sitting in a passenger seat is enabled and control in which the wishes of the occupant are also reflected can be performed.

The present invention according to claim 5 is the automatic control system for accessory devices for the automobile recited in claim 1, wherein the input means includes at least a voice recognition section which does not impede driving.

In accordance with the invention recited in claim 5, the input means includes a voice recognition section which recognizes a voice of the driver and is capable of reflecting the wishes of the driver from the voice of the driver. For example, if a voice recognition section which recognizes a voice, "YES" and "NO" or "O.K." and "not O.K.", is provided, and the driver replies "YES" and "NO" or "O.K." and "not O.K." or the like by his or her voice to the contents announced by the announcing means, and control in accordance with the replies is performed, control in which the wishes of the driver are reflected can be performed without operation of switches. Further, by means of the voice recognition section, replies to the announcing means can be made to reflect the wishes not only of the driver but also of the occupant.

The present invention according to claim 6 is the automatic control system for accessory devices for the automobile recited in claim 1, wherein each automatic control item includes an automatically controlled accessory devices for the automobile and operations of the automatically controlled accessory devices for the automobile.

BEST MODE FOR IMPLEMENTING THE INVENTION

Figure 1A:
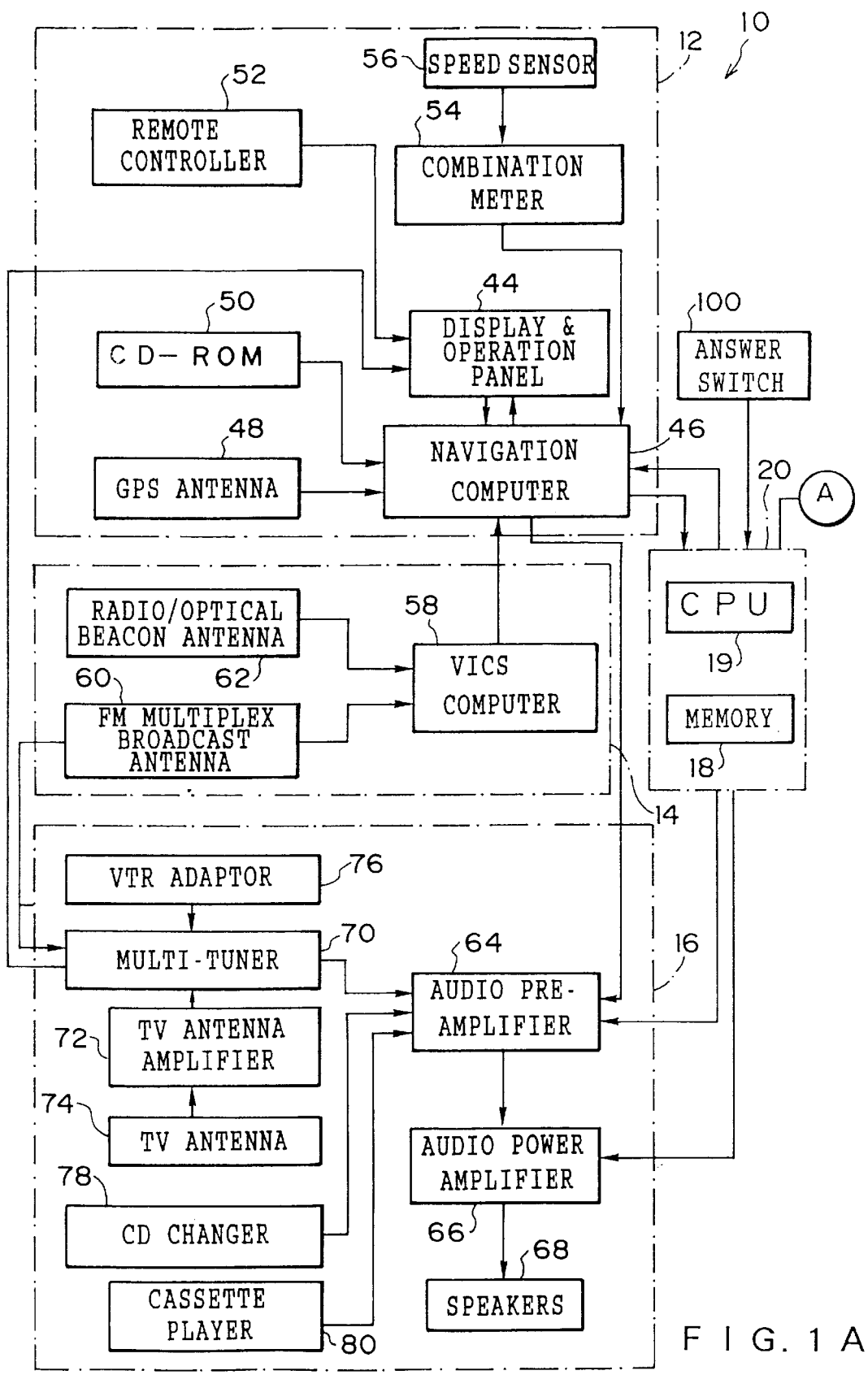
FIG. 1A and FIG. 1B are block diagrams that illustrate structure of an automatic control system for accessory devices for an automobile relating to an embodiment of the present invention.

Hereinafter, referring to the drawings, an example of an embodiment of the present invention will be described in detail. This embodiment applies the present invention to an automatic control system in which a navigation system is utilized.

Figure 1B:
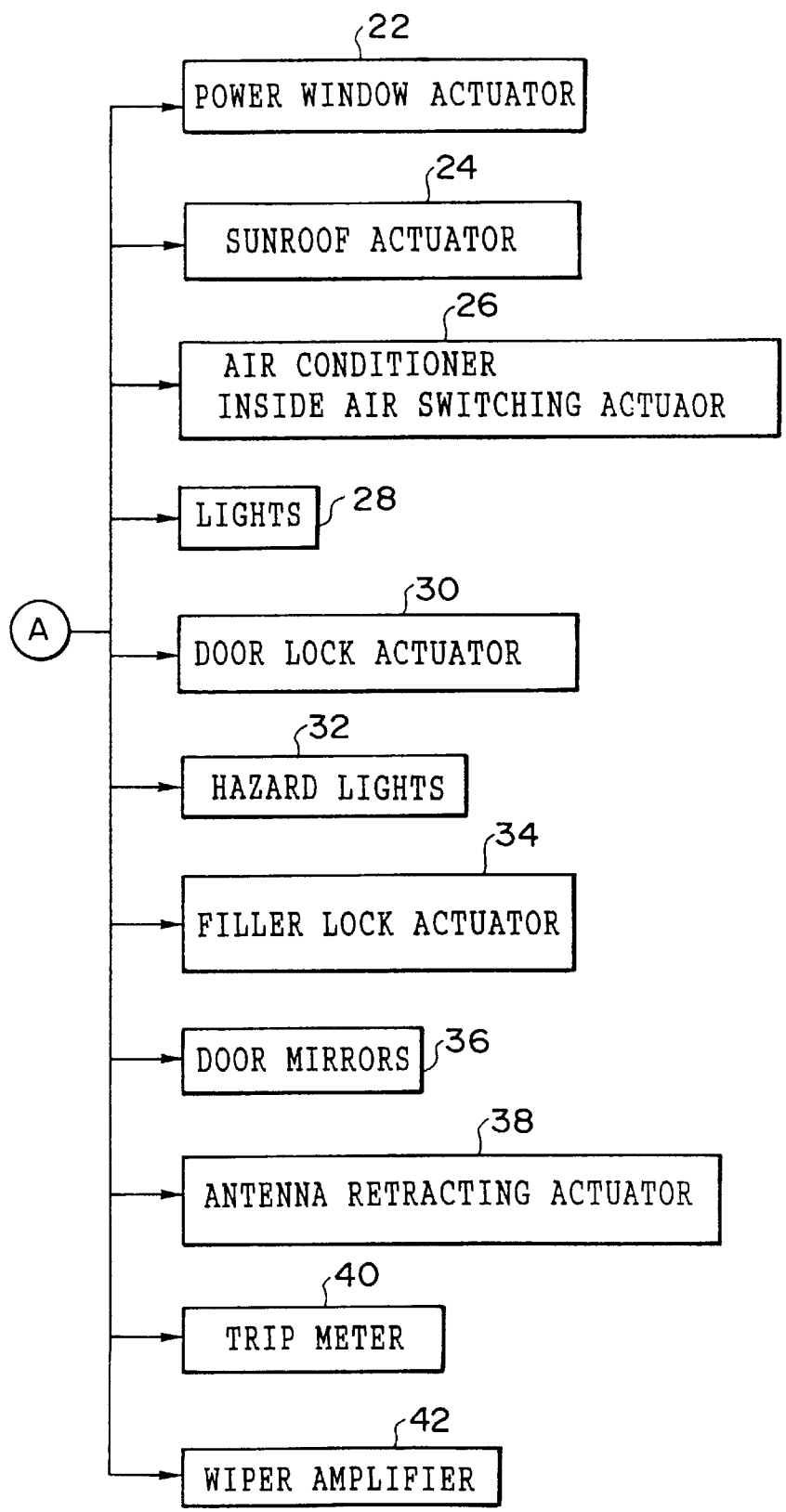

FIG. 1A and FIG. 1B are block diagrams that illustrate structure of an automatic control system 10 for accessory devices for an automobile relating to the embodiment of the present invention.

Figure 2:
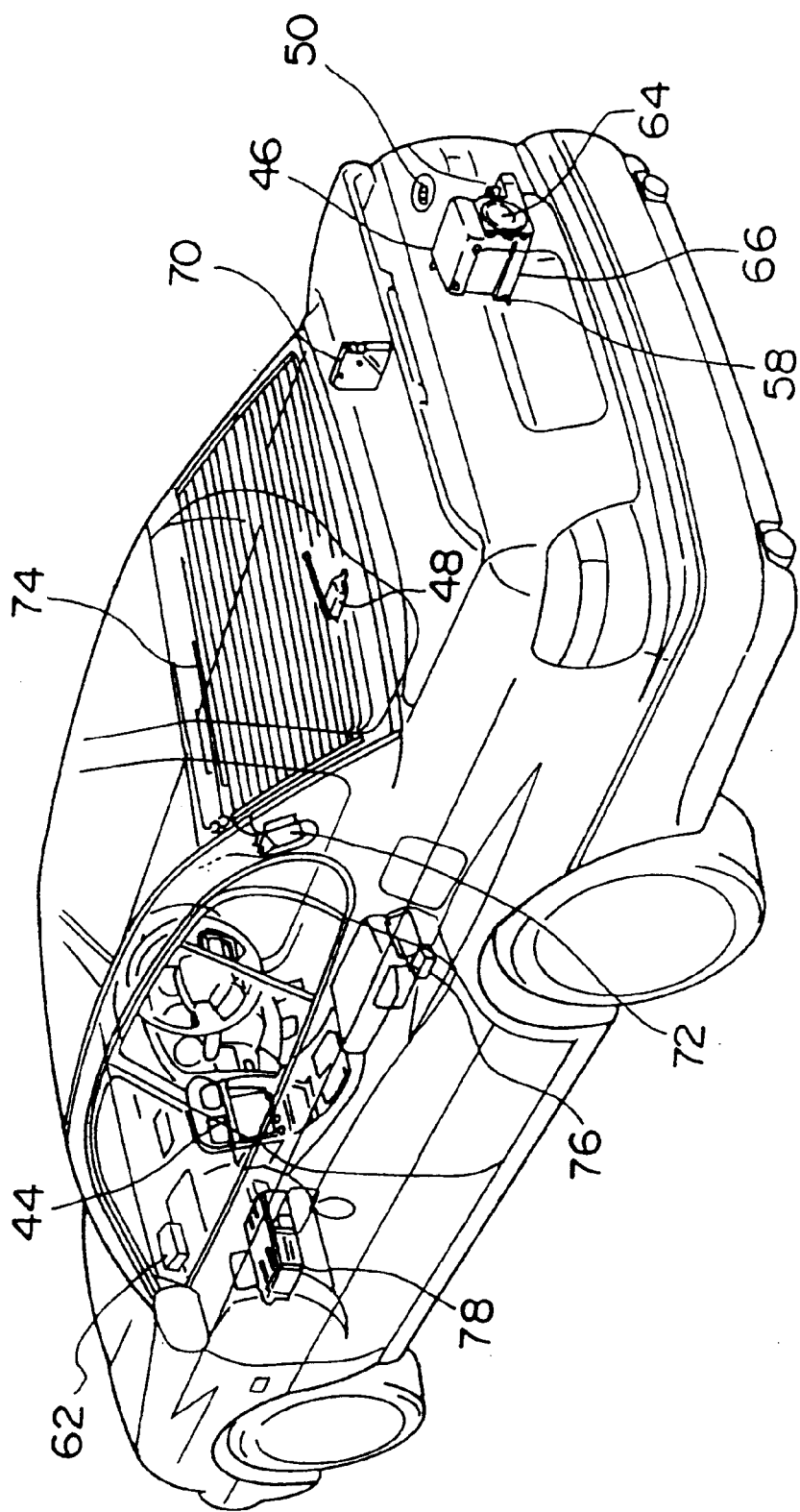
FIG. 2 is a drawing that illustrates schematic vehicle mounting positions for the automatic control system for accessory devices for the automobile.

FIG. 2 is a diagram that illustrates schematic vehicle mounting positions for the automatic control system 10 for accessory devices for the automobile.

The automatic control system 10 for accessory devices for the automobile of the embodiment of the present invention is a system which performs automatic control of accessory equipment (electrical components) mounted at an automobile using information of a navigation system 12, and the structure thereof is formed by the navigation system 12, a VICS (Vehicle Information & Communication System) device 14, an audio visual system 16, a control section 20 which performs automatic control, answer switch 100 and various kinds of electrical components attached to the automobile. Examples of the various kinds of electrical components attached to the automobile include a power window actuator 22 for opening and closing windows, a sunroof actuator 24 for opening and closing a sunroof, an air conditioner inside/outside air switching actuator 26 which switches the air conditioner between inside and outside air, lights 28, a door lock actuator 30 for opening and closing door locks, hazard lights 32, a filler lock actuator 34 for opening and closing a filler cap, door mirrors 36, an antenna retracting actuator 38, a trip meter 40, a wiper amplifier 42, and the like.

The navigation system 12 is formed in a manner such that all operations can be performed at a display & operation panel 44 which is also for performing operation of the audio system 16, such as a TV, a cassette player 80, a CD changer 78, and the like. Moreover, these operations can be performed in a remote operation manner by an occupant with a remote controller 52.

The display & operation panel 44 is disposed at a central portion of an instrument panel and is formed by panel switches and touch switches which are operated by touching a screen with a finger. A display section of the display & operation section 44 incorporates a color liquid crystal panel, can display TV images and computer output images, and has a back light, at which a cold cathode tube (fluorescent lamp) is used, built in at a back side of the color liquid crystal panel.

A navigation computer 46 connected to the display & operation panel 44 is disposed at a trunk, and controls navigation functions which locates a location of said automobile, performs display of the location of the automobile on a map, and notifies route guidance information to a destination by means of the map and a guiding voice. That is, the navigation computer 46 reads data by a CD-ROM player built in at the navigation computer 46 from a CD-ROM 50 at which map information screen data, guiding voice data, and destination location data are recorded, and outputs data to the display & operation panel 44. Further, the navigation computer 46 receives signals from a GPS satellite, which is disposed at an altitude of approximately 20,000 km in outer space, at a GPS antenna 48 disposed at a parcel board behind a rear seat, determines a current location, and displays the location of the automobile together with map information recorded at the CD-ROM 50 on the display of the display & operation panel 44. Further, the guiding voice data read from the CD-ROM 50 by the navigation computer 46 is output by voice by the audio system 16, which will be described later.

Continuing, structure of the VICS device 14 will be described. VICS is a road traffic information system and is a system which provides road traffic information such as traffic jam and traffic restrictions, parking area information, journey time information and the like, directly to a device mounted at the automobile in real time. For this information, information of surface roads is collected by respective police authorities of metropolitan areas and prefectures and information of highways is collected by respective road administrators, passed through Japan Road Traffic Information Center Foundation, processed in VICS Center Foundation and provided to the device mounted at the automobile by respective media (radio beacons, optical beacons and FM multiplex broadcasts). This device mounted at the automobile is the VICS device 14, and this VICS device 14 is formed by a radio/optical beacon antenna 62 disposed at a top face of the instrument panel at a passenger seat side in order to receive radio beacons transmitted at devices installed at highways and the like by the road administrators and optical beacons transmitted at devices installed at surface roads by the police authorities of metropolitan areas and prefectures; an FM multiplex broadcast antenna 60 for receiving FM multiplex broadcasts; and a VICS computer 58 disposed at the trunk in order to demodulate VICS information received from the respective media and transfer information to the navigation computer 46.

The information obtained at the VICS device 14 is output to the navigation computer 46, processed by the navigation computer 46, displayed on the display & operation panel 44 together with the map information and the route guidance information, and made into voice guidance via the audio system 16.

The audio system 16 is formed in a manner such that the cassette player 80, the CD changer 78, and a multi-tuner 70 are connected to an audio pre-amplifier 64 which performs various kinds of adjustment such as sound quality, left and right balance, fader, tone, and the like, and sound signals from the cassette player 80, CD changer 78, multi-tuner 70, navigation computer 46 and the like are output from the pre-amplifier 64 to an audio power amplifier 66. Further, the audio pre-amplifier 64, the audio power amplifier 66, and the multituner 70 are disposed at the trunk, the cassette player 80 is built-in at the display & operation panel, and the CD changer 78 is disposed at a glove box.

Further, the audio power amplifier 66 is connected to speakers 68, and the various kinds of sound signals described above are amplified and output from the speakers 66 as sound. Also, the multi-tuner 70 is connected to the FM multiplex broadcast antenna 60, a VTR adapter 76, a TV antenna amplifier 72, and the display & operation panel 44. The TV antenna amplifier 72 which is disposed at a rear pillar is connected to a TV antenna 74, and the multi-tuner 70 outputs image signals of a TV broadcast radio signal received from the TV antenna 74, which is affixed to a rear window, to the display of the display & operation panel 44 and performs output of sound signals to the audio pre-amplifier 64. Further, the multi-tuner 70 performs output of an FM multiplex broadcast radio signal received from the FM multiplex broadcast antenna 60 to the audio pre-amplifier 64. Further, by connecting a video terminal and an audio terminal of a home audio appliance such as a portable home video tape recorder or the like to the VTR adapter 76 which is connected to the multi-tuner 70, display of VTR images at the display & operation panel 44 and sound output to the speakers 68 via the audio pre-amplifier 64 and the audio power amplifier 66 are enabled.

In the automatic control system 10 for accessory devices for the automobile of the present embodiment, a control section 20 is provided for controlling various kinds of accessory devices for the automobile and the control section 20 is connected to the various kinds of accessory devices for the automobile. Moreover, to this control section 20, the navigation system 12 and, via the navigation system 12, the VICS device 14 are connected such that external information is obtained, and the audio system 16 is connected as well. The control section 20, by the external information obtained from the navigation system 12, establishes the contents of automatic control to be performed and, via the navigation computer 46, displays messages of the automatic control contents on the display of the display & operation panel 44, and gives voice guidance via the audio system 16.

Further, the control section 20 is formed provided with a memory 18 and a CPU 19, automatic control contents (automatic control items) appropriate to conditions are stored in the memory 18 in advance, and automatic control appropriate to operation of the answer switch 100 which will be described later is performed at the CPU 19. Further, current states (before automatic control is performed) of the various kinds of accessory devices for the automobile (for example, open or closed state of windows, on or off state of lights, wiper operation state, and the like) are stored at the memory 18 such that the accessory devices for the automobile, after implementation of automatic control are returned, to original states, specifically the states before the automatic control is performed.

Further, the automatic control system 10 for accessory devices for the automobile of the present embodiment inputs a speed signal from a speed sensor 56, which is disposed at a transmission, to the navigation computer 46 via a combination meter 54 and restrict the operation such that a part of the operation of the display & operation panel 44 is not performed at a time of travelling.

Figure 3A:
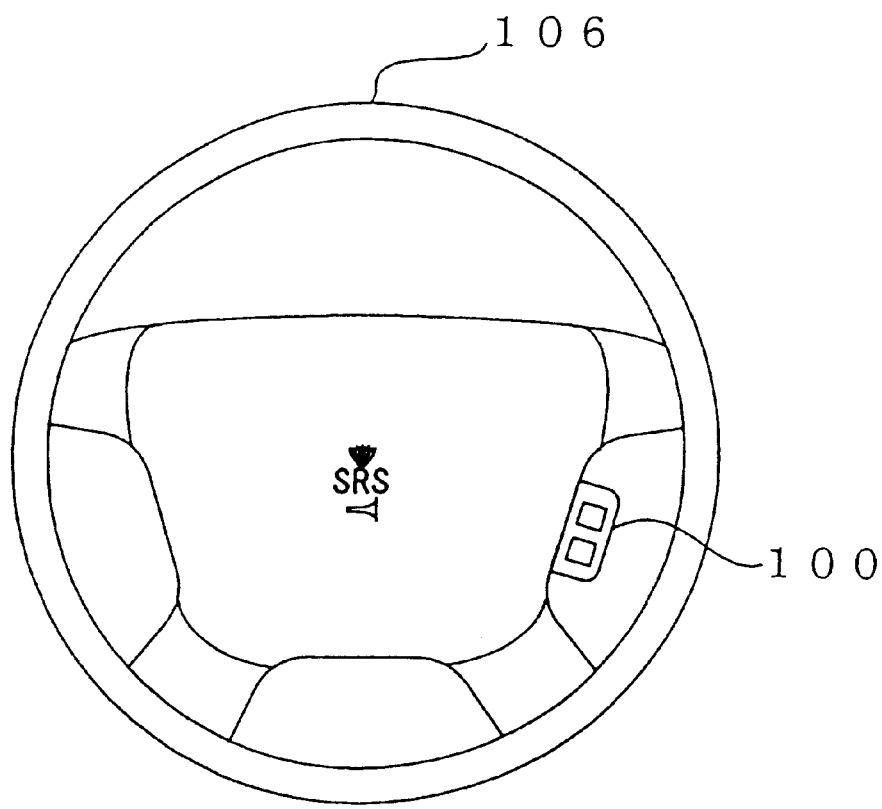
FIG. 3A and FIG. 3B are drawings that illustrate answer switches disposed at a steering wheel.
Figure 3B:
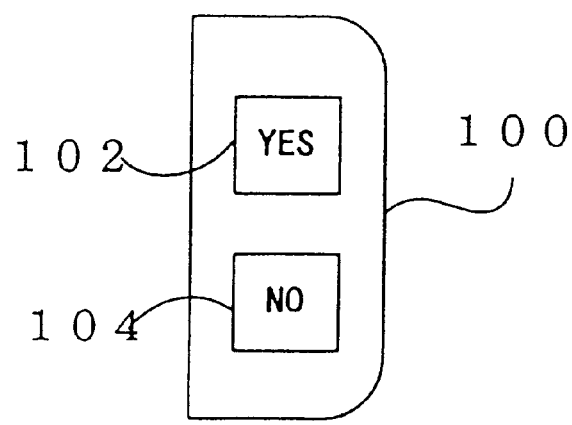

Further, to the control section 20 are connected the answer switch 100, which are formed by two switches, a YES switch 102 and a NO switch 104 and which are disposed at a steering wheel 106 as illustrated in FIG. 3A and FIG. 3B for replying YES or NO to questions from the guiding voice concerning the contents of automatic control. Also, switches that have the same function as the answer switch 100 are provided on the remote controller 52 and the display & operation panel 44. Therefore, not only the driver but also the occupant can reply YES or NO as described above. Here, the switches having the same function as the answer switch 100 provided on the remote controller 52 and the display & operation panel 44 may have a structure the same as the answer switch 100 or, for example, a volume switch or the like may have the same function as the answer switch 100.

The following are examples of the automatic control performed with the automatic control system 10 for accessory devices for the automobile in the embodiment of the present invention.

A. In a case in which tunnel information is obtained from the navigation system 12, the auto-control system 10 warns of the presence of the tunnel, turns the lights 28 on, closes the windows and sunroof, switches the air conditioner to inside air (circulation), switches audio to radio traffic information and switches the wipers to stopped state or intermittent operation, and after passing through the tunnel, returns the respective accessory devices for the automobile to the original states.

B. In a case in which toll gate information is obtained from the navigation system 12, the auto-control system 10 warns of the presence of the toll gate, opens a driver side window, closes other windows and the sunroof, turns volume of the audio down and temporarily stops the wipers, and after passing through the toll gate, returns the respective accessory devices for the automobile to the original states.

C. In a case in which gas station information is obtained from the navigation system 12 and the vehicle stops at a gas station, the auto-control system 10 opens the driver side window, opens the filler cap, resets the trip meter 40, turns the lights 28 off, and plays a guiding voice which is a registered voice such as "regular, fill it up, and do the ash tray, please" and the like.

D. In a case in which railroad crossing information is obtained from the navigation system 12, the auto-control system 10 warns of the presence of the railroad crossing, slightly opens the driver side window and turns the volume of the audio down, and after passing through the railroad crossing, returns the respective accessory devices for the automobile to the original states.

E. In a case in which destination arrival information is obtained from the navigation system 12 and the vehicle is stopped, the auto-control system 10 closes the windows and the sunroof, releases the door locks, retracts the door mirrors 36, and turns the lights 28 off.

F. While travelling a highway, in a case in which traffic jam information for the road being driven along is obtained from the VICS device 14 and the navigation system 12 and a brake is applied for a predetermined period of time, the auto-control system 10 turns the hazard lights 32 on. In addition, in this case, it is necessary to input switching information of a brake switch to the control section 20. It should be noted that in A–F, for example, "turns the lights 28 on" in A signifies that the lights are turned on in a case in which the lights 28 have not been turned on and, in a case in which the lights 28 have already been turned on, the turned on condition of the lights 28 is preserved.

Next, operation of the present embodiment for a case in which automatic control of the above-described A is performed will be described with reference to the flow charts of FIG. 4A and FIG. 4B.

Figure 4A:
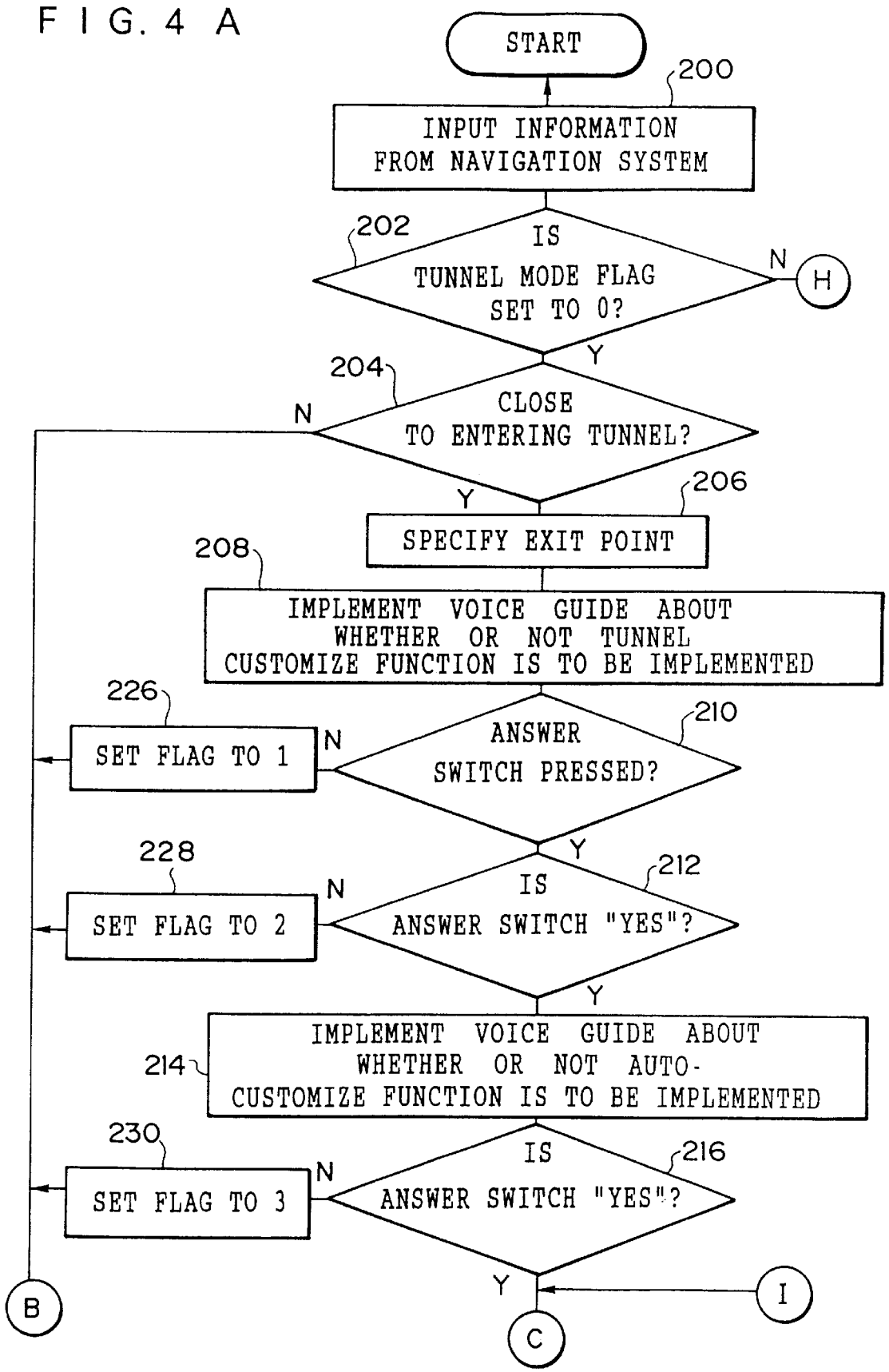
FIG. 4A and FIG. 4B are flow charts which show flows of processing of the automatic control system for accessory devices for the automobile relating to the present embodiment.
Figure 4A:
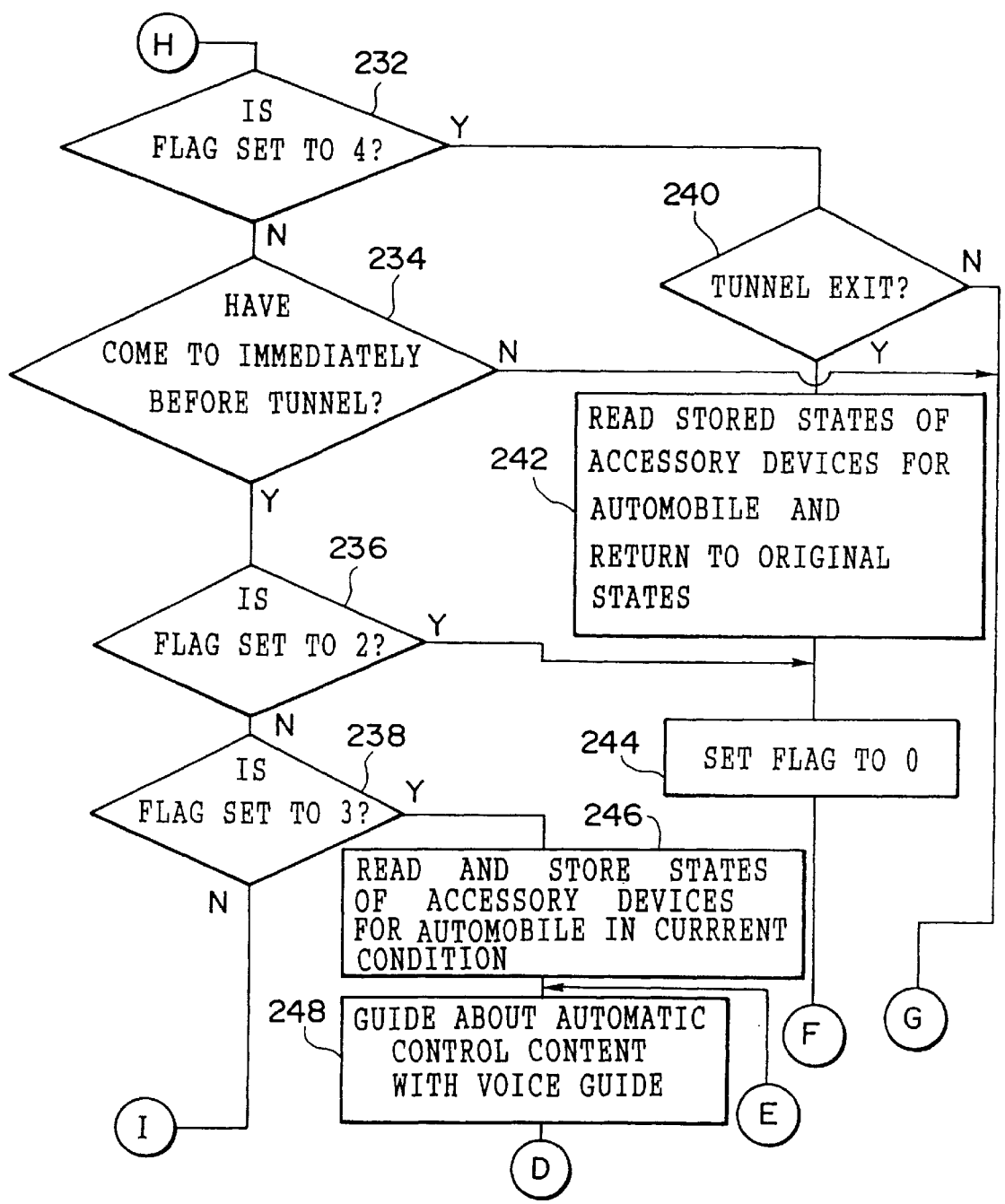
Figure 4B:
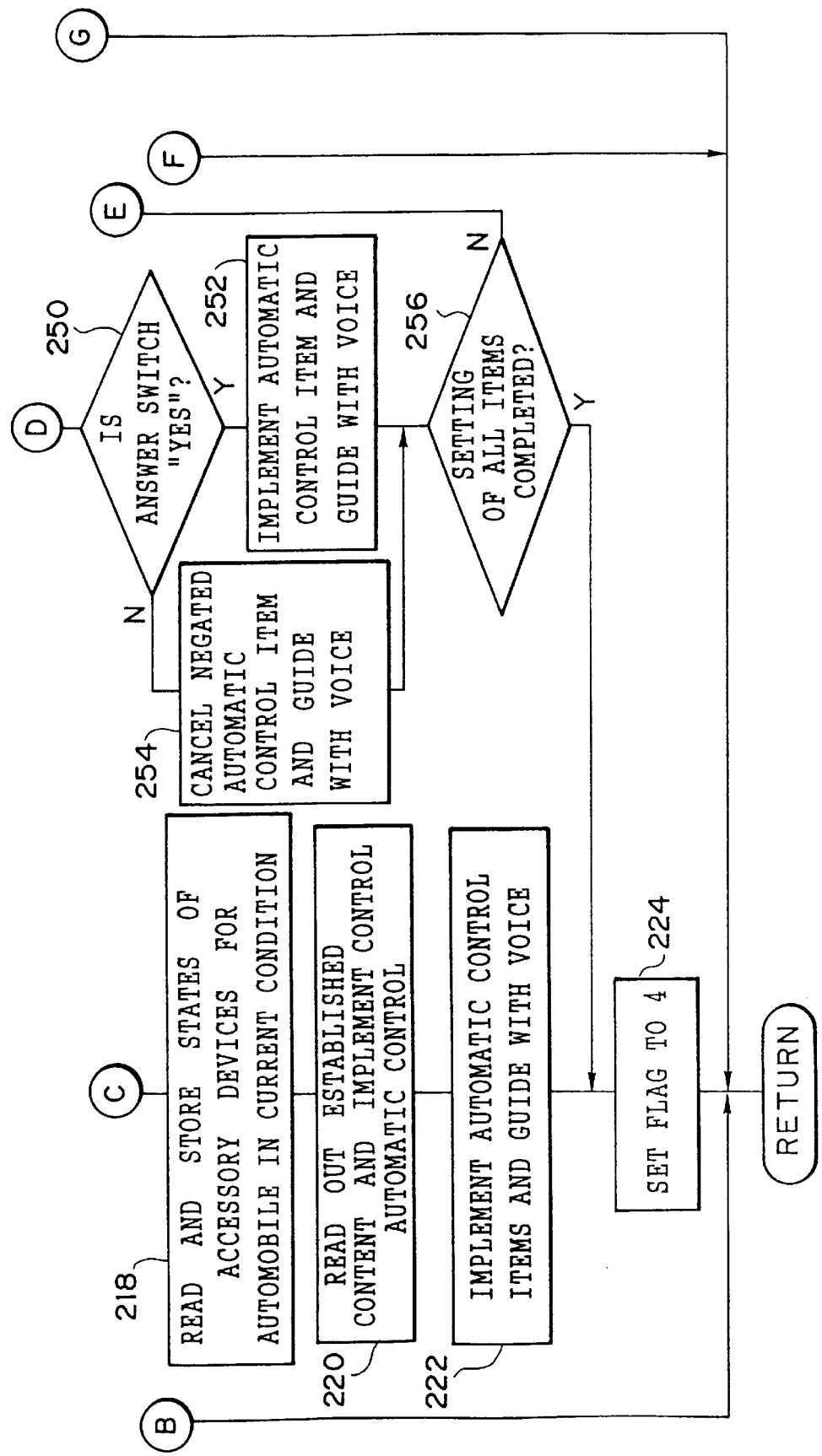

Correspondence among modes performed in the present embodiment, contents of the modes, and flags corresponding to the modes in the flow charts of FIG. 4A and FIG. 4B are described in Table 1.

TABLE 1

| Mode | Flag | Contents of mode |
| --- | --- | --- |
| Initial | 0 | Initial state |
| Full-Auto | 1 | All automatic control items are executed |
| Cancel | 2 | All automatic control items are canceled |
| Semi-Auto | 3 | Respective automatic control items are performed on the basis of the driver's decision, for each automatic control item, as to whether the automatic control item should be performed. |
| Implementation | 4 | Automatic control is being implemented |

If tunnel information is input from the navigation system 12 to the control section 20 in step 200, the routine moves to step 202, and it is determined whether a tunnel mode flag is 0 (flag 0: initial state). In a case in which the determination of step 202 is positive, i.e. the flag is 0, the routine moves to step 204. In step 204, from the information of the navigation system 12, whether the vehicle is close to entering the tunnel is determined. Step 200 to step 204 will be repeated until the determination of step 204 is positive. When the determination of step 204 is positive, i.e. the vehicle is close to entering the tunnel, the routine moves to subsequent step 206. At step 206, tunnel exit information is shown and, in subsequent step 208, voice guidance such as, "Entering a tunnel. Shall I execute the tunnel customize function (the automatic control for accessory devices for the automobile which has been set in advance) ?" is played and the same message is displayed on the display of the display & operation panel 44, to inform the driver. Subsequently, in step 210, whether the driver presses the answer switch 100 within a predetermined time is determined. In a case in which the driver presses the answer switch 100 within the predetermined time, step 210 is determined to be positive and the routine moves to step 212 and, in a case in which the driver does not press the answer switch 100 within the predetermined time, the routine moves to step 226. Further, in step 212, in a case in which the driver pressed the YES switch 102 of the answer switch 100 in step 210, the routine moves to step 214 and, in a case in which the driver pressed the NO switch 104, the routine moves to step 228.

In step 214, voice guidance such as "Shall I perform the auto-customize function ?" is provided to the driver, and in subsequent step 216, the determination of the driver is input. In step 216, if the driver gives a negative determination by the answer switch 100, the routine moves to step 230, and if the driver performs a positive determination, the routine moves to step 218.

In step 218, states of the accessory devices for the automobile in the current condition (open/closed windows, lights on/off, inside/outside air at the air conditioner, use/non-use of the wipers, and the like) is read and stored at the memory 18 of the control section 20. Then, in step 220, automatic control content for a tunnel mode which have been stored in the memory 18 of the control section 20 in advance are read and, in step 222, while the respective automatic control items of the automatic control content is being implemented, the driver is informed that automatic control is being performed, by messages displayed on the display of the display & operation panel 44 and voice guidance. In subsequent step 224, a mode is set to flag 4 (the tunnel mode is being implemented) and the routine is returned to step 200.

On the other hand, in a case in which the driver does not press the answer switch 100 in step 210 for whether or not the tunnel customize function is to be performed, the routine moves onto step 226 and the mode is set to flag 1 (full auto mode), and the routine is returned to step 200. Further, in step 212, if the driver presses the NO switch 104 of the answer switch 100, the flag of the mode becomes 2 (automatic control cancel mode) and routine is returned to step 200. Further, at step 216, in a case in which the driver performs a negative determination with the answer switch 100, the mode is set to flag 3 (semi-auto mode) in step 230 and the routine is returned to step 200.

When the flag is set to one of 1, 2, 3, and 4 in steps 224, 226, 228, and 230 and the routine is returned to step 200, subsequent step 202 has a negative determination and the routine moves to step 232.

In step 232, whether the flag is 4 (automatic control is being implemented) is determined and, in cases other than a case in which the flag is 4 (automatic control is being implemented), the routine moves to step 234 and it is determined whether or not the vehicle has come to immediately before a tunnel. Here, when it is determined that the vehicle has come to immediately before a tunnel, the routine moves to step 236 and whether the flag is 2 (automatic control cancel mode) is determined. In a case in which the flag is not 2 (automatic control cancel mode) at step 236, in subsequent step 238 whether the flag is 3 (semi-auto mode) is further determined and, in a case in which the flag is not 3 (semi-auto mode), i.e. the flag is 1 (full-auto mode), the routine moves to step 218, automatic control from step 218 till step 224 is performed as described above and the routine is returned to step 200. That is, in a case in which the driver does not operate the answer switch 100 in step 210 (flag 1), the automatic control content (the respective automatic control items) stored in advance are executed as the fullauto mode.

Further, if the flag is determined to be 4 (automatic control is being implemented) in step 232, the routine moves to step 240, in step 240, the information of the navigation system 12 is used to determine an exit of the tunnel or not and, if it is determined that it is an exit of the tunnel, the routine moves to step 242, the states of the accessory devices for the automobile stored prior to performing automatic control are read from the memory 18, the states of the accessory devices for the automobile are returned to the original states and, in subsequent step 244, initial state flag 0 (the initial state) is set and the routine is returned to step 200. Further, in step 240, if it is determined that it is not the exit of the tunnel, the routine is returned to step 200 and, until the exit of the tunnel is determined, steps 200, 202, 232, and 240 are performed.

On the other hand, in step 234, if not being immediately before the tunnel is determined, the routine is returned to step 200, and steps 200, 202, 232, and 234 are repeated until being immediately before the tunnel is determined.

Further, if the flag is determined to be 2 (automatic control cancel mode) in step 236, the routine moves to step 244, the flag returns to the initial state, 0, and the routine is returned to step 200.

Further, if the flag is determined to be 3 (semi-auto mode) in step 238, the routine moves to step 246, the states of the accessory devices for the automobile in the current condition (open/closed windows, lights on/off, inside/outside air at the air conditioner, use/non-use of the wipers, and the like) is read and stored at the memory 18 at the control section 20, and the routine moves to step 248. In step 248, while voice guidance for each the automatic control item such as "Shall I turn the lights on?"is played, display of messages at the display of the display & operation panel 44 is performed and the driver is asked about the advisability of each automatic control item. In step 250, the driver operates the answer switch 100 and determines the advisability of each automatic control item. In step 252, each automatic control of item affirmed at step 250 is performed and, while voice guidance such as, for example, "Turning the lights on." is performed, messages are displayed on the display of the display & operation panel 44. Further, in a case in which an item is negated at step 250, in step 254 the negated automatic control item is canceled and a message is displayed on the display of the display & operation panel while voice guidance such as "Turning on of lights canceled." is performed.

Subsequently, in step 256, whether setting of all automatic control items has ended is determined, processings of step 248 to step 254 are carried out until setting of all automatic control items has ended, and when setting of all automatic control items is completed, the routine moves to the step 204, the flag is set to 4 (automatic control is being implemented) and the routine is returned to step 200. When the flag is set to 4 (automatic control is being implemented) and the routine is returned to step 200, steps 240 to 244 are executed as described above.

Further, in the above-described embodiment, the settings for the semi-auto mode and the full-auto mode have been made using the flags 3 and 4 but, in response to the condition (the condition based on the trigger information) (a railroad crossing, highway, and the like), setting for only semi-auto mode or only full-auto mode may be done, a processing routine for one of flag 3 and flag 4 may be omitted and a burden of the driver may be reduced.

Further, in the aforementioned embodiment, the display messages and voice guidance for the automatic control items of step 248 are questioning messages and voice guidance, but positive messages and voice guidance such as "Turning on the lights 28." may be used and, in a case in which operation of the answer switch 100 is not performed within the predetermined time, the wish of the driver is determined to be YES and automatic control may be performed. Further, the answer switch 100 includes two switches, the YES switch 102 and the NO switch 104, but in a case in which all display messages and voice guidance are set to be positive as described above and the driver's wish is determined to be YES if switch operation is not performed within the predetermined time, the answer switch 100 can include only a single switch, and driver operations can be simplified.

Further, the answer switch 100 in the embodiment of the present invention enable broad uses. For example, when opening/closing windows and the like at a highway toll gate and the like, information of the toll gate is obtained from the navigation system 12 and, by a positive message such as "Entering power window switch mode.", the answer switch 100 change to a power window switch and it becomes possible for a driver to operate without removing a hand from the steering wheel 106. Further, at this time, a switch knob display of the answer switch 100 may be changed. In this way, in a case in which there is an operation at a predetermined place, a control in which a switch is changed to another switch and the like may be performed.

Moreover, in the present embodiment, the wishes of the driver are reflected by means of the answer switch. However, the wishes of the driver may be reflected at a voice recognition section which detects a voice such as the driver's voice, "YES", "NO" and the like.

Further, the present embodiment has a structure in which the trigger information for performing automatic control is obtained from the navigation system, but is not limited to this structure; a variety of sensors and the like may be used for obtaining trigger information.

In accordance with the present invention, as described above, by adding a function in which the driver can decide with respect to whether or not automatic control for the accessory devices for the automobile is to be executed, an excellent effect of enabling control that reflects the driver's wishes easily is provided.

What is claimed is:

1. An automatic control system for accessory devices for an automobile which automatically controls a plurality of the accessory devices for the automobile, which are disposed at the automobile, in accordance with a predetermined condition, comprising:

a detecting circuit which detects trigger information for starting automatic control;

a control circuit which stores a plurality of automatic control contents, each of which is a combination of automatic control items for the accessory devices for the automobile, determines an automatic control content on the basis of the trigger information detected by the detecting circuit, and performs control of the accessory devices for the automobile in accordance with the automatic control content;

an announcing section which announces the automatic control content to be performed by the control circuit before automatic control is performed; and, an input circuit for inputting a reply concerning advisability of implementation of all or some of the automatic control content announced by the announcing section;

wherein the automatic control is performed in accordance with the reply that is inputted at the input circuit.

2. The automatic control system for accessory devices for the automobile according to claim 1, wherein the detecting circuit is a navigation system which locates location of the automobile.

3. The automatic control system for accessory devices for the automobile according to claim 2, wherein the trigger information is map information associated with the location of the automobile which is transmitted from the navigation system.

4. The automatic control system for accessory devices for the automobile according to claim 1, wherein the input circuit is formed by two operating sections which are YES and NO.

5. The automatic control system for accessory devices for the automobile according to claim 1, wherein the input circuit includes at least a voice recognition section which does not impede driving.

6. The automatic control system for accessory devices for the automobile according to claim 1, wherein each automatic control item includes an automatically controlled accessory device for the automobile and operations of the automatically controlled accessory devices of the automobile.

7. An automatic control system for accessory devices for an automobile which automatically controls a plurality of the accessory devices for the automobile, which are disposed at the automobile, in accordance with a predetermined condition, comprising:

a detecting circuit which detects trigger information for starting automatic control;

a control circuit which stores a plurality of automatic control contents, each of which is a combination of automatic control items for the accessory devices for the automobile, determines an automatic control content on the basis of the trigger information detected by the detecting circuit, and performs control of the accessory devices for the automobile in accordance with the automatic control content;

an announcing section which announces the automatic control content to be performed by the control circuit before automatic control is performed, and an input circuit for inputting a yes or no reply with respect to implementation of the automatic control content announced by the announcing section;

wherein the automatic control system has:

a full automatic mode in which all automatic control items included in the determined automatic control content are performed;

a semiautomatic mode in which some automatic control items included in the determined automatic control content, which are chosen by a person in the vehicle, are performed, wherein the person in the vehicle can select the full automatic mode or the semiautomatic mode.

8. An automatic control system for accessory devices for an automobile according to claim 7, wherein in the semiautomatic mode, each of the automatic control items included in the determined automatic control content is announced by the announcing section and the person in the vehicle inputs a yes or no reply with respect to implementation of each of the automatic control items to the input circuit.

* * * * *